US011058978B2

(12) United States Patent
Dietrich et al.

(10) Patent No.: US 11,058,978 B2
(45) Date of Patent: Jul. 13, 2021

(54) DIESEL PARTICLE FILTER CLEANING METHOD AND APPARATUS (71) Applicant: Mack GmbH, Mainhardt (DE)

(72) Inventors: Marco Dietrich, Schwaebisch-Hall (DE); Walter Dieter Mack, Mainhardt (DE)

(73) Assignee: MACK GMBH, Mainhardt (DE)

( * ) Notice: Subject to any disclaimer, the term of this patent is extended or adjusted under 35 U.S.C. 154(b) by 107 days.

(21) Appl. No.: 15/228,191

(22) Filed: Aug. 4, 2016

(65) Prior Publication Data
US 2017/0036148 A1 Feb. 9, 2017

(30) Foreign Application Priority Data
Aug. 6, 2015 (DE) ...................... 10 2015 112 939.6

(51) Int. Cl.
*B01D 41/04* (2006.01)
*B08B 5/02* (2006.01)
*F01N 3/023* (2006.01)

(52) U.S. Cl.
CPC ................ *B01D 41/04* (2013.01); *B08B 5/02* (2013.01); *F01N 3/023* (2013.01); *F01N 3/0237* (2013.01)

(58) Field of Classification Search
None
See application file for complete search history.

(56) References Cited

U.S. PATENT DOCUMENTS

| 5,437,788 A * | 8/1995 | Geibel | B01D 29/114 210/333.01 |
| 7,591,271 B2 | 9/2009 | Rabitsch | |
| 8,273,185 B2 | 9/2012 | Milles | |
| 8,591,666 B2 | 11/2013 | Spruegel | |
| 2004/0045439 A1* | 3/2004 | Zilliox | B01D 41/02 95/281 |
| 2012/0111370 A1* | 5/2012 | Milles | B01D 41/04 134/22.18 |

(Continued)

FOREIGN PATENT DOCUMENTS

DE 29519922 U1 3/1996
DE 602004002695 T2 8/2007
(Continued)

OTHER PUBLICATIONS

English Translation of Chinese Office Action issued for Application No. 201610630119.6 dated Feb. 6, 2020, 8 pages.

*Primary Examiner* — Mikhail Kornakov
*Assistant Examiner* — Pradhuman Parihar
(74) *Attorney, Agent, or Firm* — Reising Ethington, P.C.

(57) ABSTRACT

A method for cleaning a filter arrangement which has a first fluid connector, a second fluid connector and a filter device which is arranged between the first and second fluid connectors and which has a surface to which contaminants can adhere. The method has the following steps: connecting the first fluid connector to a blowing chamber which has a gas connector, at least partially filling the blowing chamber with a liquid, and generating a cleaning pulse, in which gas is conducted under pressure via the gas connector into the blowing chamber for a first time duration, such that a gas-liquid mixture is forced via the first fluid connector through the filter device and out of the second fluid connector.

17 Claims, 3 Drawing Sheets

(56) References Cited

U.S. PATENT DOCUMENTS

2013/0298771 A1* 11/2013 Albrecht ............... F01N 11/002
                                                          95/279

FOREIGN PATENT DOCUMENTS

| | | |
|---|---|---|
| DE | 60037220 T2 | 12/2008 |
| DE | 102010036928 A1 | 2/2012 |
| EP | 1060780 A1 | 12/2000 |
| EP | 1302232 B1 | 4/2003 |
| EP | 1336729 A1 | 8/2003 |
| EP | 2270319 A1 | 1/2011 |
| EP | 2415982 A1 | 2/2012 |
| EP | 2459853 B1 | 5/2013 |
| JP | 2014195759 A1 | 10/2014 |
| WO | WO02094415 A1 | 11/2002 |
| WO | WO2004073835 A1 | 9/2004 |
| WO | WO2006096244 A1 | 9/2006 |
| WO | WO2008042371 A1 | 4/2008 |
| WO | WO2009032175 A2 | 3/2009 |
| WO | WO2015054771 A1 | 4/2015 |

* cited by examiner

DIESEL PARTICLE FILTER CLEANING METHOD AND APPARATUS

CROSS-REFERENCE TO RELATED APPLICATIONS

This application claims priority from German patent application DE 10 2015 112 939.6, filed Aug. 6, 2015. The entire content of this priority application is incorporated herein by reference.

BACKGROUND

The present invention relates to a method for cleaning a filter arrangement which has a first fluid connector, a second fluid connector and a filter device which is arranged between the first and second fluid connectors and which has a surface to which contaminants can adhere.

The present invention relates in particular to a method for cleaning a diesel particle filter, specifically in particular in an uninstalled state.

The present invention also relates to a filter cleaning apparatus which is designed and set up to carry out a cleaning method of said type.

Diesel particle filters (DPF) serve for removing the soot particles which are emitted by a diesel engine from the exhaust gas. In the case of particle filters of said type, a distinction is made between closed and open systems. Closed particle filters generally have a honeycomb body which is composed of a ceramic and which has a large number of parallel ducts. Adjacent ducts are closed off at respectively opposite sides such that the exhaust gas must flow through the porous ceramic walls.

By contrast, open particle filters allow a part of the exhaust gas to flow, unfiltered, past a filter wall.

Particle filters are regenerated at regular intervals. The regeneration is performed by virtue of the soot that has collected in the filter being burned off. Such a regeneration is performed as required for a certain period of time during rated-power operation of the diesel engine.

Despite said regeneration cycles, it is often necessary, after a certain distance travelled, for the particle filter to be mechanically cleaned, for which purpose the filter is uninstalled (for example every 120,000 km).

Various methods are known for the cleaning of uninstalled particle filters. For example, the document DE 295 19 922 U1 discloses an apparatus for the regeneration of filter elements outside a separator, wherein the filter elements are cleaned by way of compressed-air pulses. The dust that is cleared out falls via a dust collecting chamber into a dust collecting container.

Document DE 600 37 220 T2 discloses a method in which a cleaning phase, during the course of which a cleaning liquid flows under pressure through the filter substrate of a filter, and an expulsion and/or drying phase, in which a pressurized gas such as compressed air can flow through the filter substrate, are performed alternately. The duration of the cleaning phase may in this case lie between one and several minutes.

From document DE 10 2010 036 928 A1, it is known for filters to be cleaned by blasting them with a blasting medium, wherein the blasting medium is gaseous and comprises solid or liquid blasting agent with a boiling point of no higher than 120° C., wherein the blasting medium is accelerated so as to strike the filter at approximately the speed of sound and so as to have a mean temperature of below 0° C. when it exits the blasting nozzle.

From document DE 60 2004 002 695 T2, it is known for filter components to be subjected to an atmosphere of superheated steam at a pressure of at least 0.5 bar in a container, and for the container to subsequently be decompressed.

Document EP 1 302 232 B1 proposes the soaking of a filter in a cleaning liquid. Furthermore, from document WO 02/094415 A1, a method for cleaning a particle filter is known, wherein a cleaning flow is caused to circulate through the particle filter, which cleaning flow is composed of a mixture of liquid and gas. The gas and the liquid are in this case mixed in a mixer. The ratio of liquid volume to gas volume should lie between $1/5$ and $1/10$. Thus, a flow of a liquid is realized which comprises bubbles with a diameter in a range between 0.1 mm and 0.6 mm, specifically with a flow speed of greater than 100 l/min. The cleaning process advantageously lasts between 5 seconds and 15 seconds.

Document WO 2004/073835 A1 proposes pivoting a filter within a container with cleaning liquid in order to cause liquid to flow back and forth.

Furthermore, document WO 2006/096244 A1 discloses a method in which residues in a diesel particle filter are eliminated by combustion. Document WO 2008/042371 A1 proposes bringing ash deposits into contact with an acidic composition. Furthermore, it is known from WO 2009/032175 A1 for compressed air to be blown into a filter on one side through nozzle elements, wherein the nozzle elements are moved transversely with respect to the filter surface. Furthermore, from document WO 2015/054771 A1, it is known for a filter to be placed into an ultrasound bath in order to remove contaminants from a filter.

Finally, from document EP 2 459 853 B1, a cleaning method for vehicle exhaust-gas filters is known, wherein a filter which has a first and a second end and multiple elongate ducts is connected to the underside of a chamber such that the outlet thereof is fluidically connected to the first end of the filter. The lower end of the filter is subsequently covered. Liquid is subsequently introduced into the filter, specifically from above via the chamber, such that the filter and the chamber are substantially filled with liquid. Subsequently, a pressurized-gas pulse is introduced into the chamber. At the second end of the filter, the pressure is measured, and the second end of the filter is opened up only when a predefined threshold pressure has been measured, in order to enable the gas to force the dirt and the liquid out of the second end of the filter.

The known methods require either cumbersome equipment or require a high level of energy input. Furthermore, the cycle duration for the complete cleaning of a particle filter is often relatively long.

SUMMARY

Against this background, it is an object of the invention to specify an improved method for cleaning a filter arrangement.

The above object may be achieved by way of a method for cleaning a filter arrangement which has a first fluid connector, a second fluid connector and a filter device which is arranged between the first and second fluid connectors and which has a surface to which contaminants can adhere, wherein the method has the following steps: connecting the first fluid connector to a blowing chamber which has a gas connector, at least partially filling the blowing chamber with a liquid, and generating a cleaning pulse, in which gas is conducted under pressure via the gas connector into the blowing chamber, specifically for a first time duration which is preferably shorter than 0.5 s, such that a gas-liquid mixture is forced via the first fluid connector through the filter device and out of the second fluid connector.

The above object is furthermore achieved by way of a filter cleaning apparatus which is designed and set up to carry out a method according to the invention.

A further aspect of the invention relates to the use of a pressurized gas-liquid mixture for cleaning a diesel particle filter, wherein the gas-liquid mixture is introduced in pulsed fashion into the diesel particle filter.

By way of the method according to the invention, an excellent cleaning action is achieved, specifically with little energy outlay and with a simple construction in terms of equipment.

The surprisingly good action of the cleaning pulse may possibly be described as follows, though it is not the intention for the explanations given to be construed as being restrictive. The abrupt inflow of the gas into the blowing chamber has the result that the liquid contained therein is swirled up and possibly even atomized. The gas-liquid mixture is subsequently forced under pressure through the filter device. It is assumed that the liquid droplets contained in said mixture mechanically act on the contaminants so as to carry them away, even if the contaminants have adhered to the filter device. In other words, the liquid droplets impart mechanical or kinetic energy to the contaminants.

As stated, the above illustration constitutes an attempt at an explanation, to which the invention is however not restricted.

The connection of the first fluid connector to the blowing chamber is preferably realized in fluid-tight fashion. The blowing chamber is preferably a static blowing chamber which may form part of the cleaning apparatus and to which in each case one filter arrangement is fixed in order to perform a cleaning process on said filter arrangement.

Where a pressurized gas is referred to in the present context, this means that the pressure of the gas is higher than atmospheric pressure, that is to say in particular is higher than 1 bar.

The gas pressure before introduction into the blowing chamber is preferably higher than 2 bar, preferably higher than 4 bar, and in particular higher than 7 bar. The gas pressure is preferably lower than 15 bar. The gas pressure may furthermore be set such that the pressure in the blowing chamber during the cleaning pulse lies in a range of higher than 1 bar to 3 bar. Other pressure values are self-evidently possible, in particular in a manner dependent on the conditions. The above values relate in particular to a diesel particle filter for utility vehicles, which has a diameter of, for example, approximately 40 cm and an axial length of, for example, 50 cm. Said values are however intended purely to be guide values for the purposes of being able to discuss the invention more easily.

The first time duration for which gas is conducted under pressure via the gas connector into the blowing chamber is preferably shorter than 3 s, in particular shorter than 2 s, and is preferably in a range from 1.5 s to 0.5 s. Here, these and all following specifications also preferably relate to the cleaning of a utility vehicle DPF.

The gas and the liquid are preferably not pre-warmed, such that the energy to be expended is relatively low.

The gas may for example be air.

The liquid may be water, in particular fully desalinated water, to which there is preferably added a cleaning additive, specifically preferably in a range from 0.1 vol % to 5 vol %.

The ratio of the volume of the blowing chamber to the volume of the filter arrangement preferably lies in a range from 1:4 to 1:1.

It is particularly preferable for the filter arrangement to be attached to the blowing chamber such that the filter arrangement is, in a vertical direction, arranged at least partially above the blowing chamber.

In this case, the liquid contained in the blowing chamber can remain in the blowing chamber owing solely to gravitational forces until the point of introduction of the gas.

It is preferably the case that, as viewed in an axial direction, the gas connector is situated on a side of the blowing chamber situated opposite the first fluid connector. The gas connector is preferably arranged such that the gas entering the blowing chamber is forcibly conducted through the liquid contained therein. The gas is in this case preferably blown into the blowing chamber from the bottom upward, counter to the gravitational force.

The blowing chamber may be completely filled with liquid. It is however particularly preferable if there is a spacing of preferably greater than 0.5 cm, in particular greater than 2 cm, and preferably less than 50 cm, in particular less than 25 cm, from a surface of the liquid contained in the blowing chamber to the first fluid connector.

A longitudinal axis of the cleaning arrangement may be oriented either exactly vertically or else may be inclined relative to the vertical by an angle which may lie in the range from 1° to 90°, but which is preferably less than 90°, in particular less than 60°.

The inclination is preferably coordinated with the shape of the blowing chamber and the volume of the liquid contained therein such that, preferably, no liquid enters the filter device before the cleaning pulse is introduced.

In alternative variant, it is however also possible for the liquid to be introduced up to a level at which at least a part of the filter device is wetted by the water as liquid, such that the level of the liquid rises above the first fluid connector.

The filter arrangement may in particular be a diesel particle filter arrangement, in particular of the so-called closed type. Here, adjacent ducts of a ceramic honeycomb body are closed off at respectively opposite sides by way of plugs, such that the gas-liquid mixture must flow through the porous ceramic walls. The diesel particle filter may however also be in the form of an open particle filter.

The diesel particle filter may be installed in motor vehicles, such as utility vehicles, passenger motor vehicles and the like, though may also be integrated into the drive train of boats, of ships, of locomotives etc.

The object is therefore achieved in its entirety.

It is preferable, in the case of the method, if the second fluid connector is open, such that the gas-liquid mixture emerging from the second fluid connector can emerge from the filter device in substantially unimpeded fashion. In addition or alternatively, the second fluid port may be connected, specifically preferably in fluid-tight fashion, to a capture chamber, the volume of which is larger than a volume of the blowing chamber.

An open second fluid connector is to be understood in particular to mean that said fluid connector is not covered during the cleaning pulse. A spacing between the second fluid connector and a surface running transversely with respect thereto during the cleaning pulse is preferably greater than 0.5 m, in particular greater than 1.5 m.

The volume of the capture chamber may in particular be greater than half of a volume of the gas volume used during the cleaning pulse, when said gas volume is expanded (that is the say is not pressurized). In particular, the volume of the capture chamber may be greater than or equal to said volume.

In the present case, all specifications regarding volumes relate to an ambient pressure of 1 bar and an ambient temperature of 20° C., unless stated otherwise.

In the case of a capture chamber being used, the gas-liquid mixture which emerges from the filter device and which is contaminated with contaminants from the filter device can be captured in order to subsequently be subject to suitable treatment.

In a further preferred exemplary embodiment, a ratio between a gas volume of the gas that is used in the cleaning pulse and a liquid volume of the liquid that is used in the cleaning pulse lies in a range between 20:1 and 4000:1. It is particularly preferable for said ratio to be greater than 150:1, in particular greater than 200:1. Said ratio is preferably lower than 1000:1 and in particular lower than 500:1.

It emerges from this that the gas-liquid mixture comprises a relatively large volume of gas, in which a relatively small amount of liquid is received. By contrast to known methods, in which gas bubbles are contained in a liquid, the present gas-liquid mixture is preferably be considered as being a gas containing droplets.

In many cases, it is sufficient for the cleaning pulse to be performed a single time.

It is however particularly preferable for a cleaning pulse of said type to be performed up to four times in succession, that is to say before a drying process takes place.

In a further preferred embodiment, after the cleaning pulse or after the cleaning pulses, at least one drying pulse is generated, wherein gas is conducted under pressure into the filter device, specifically for a second time duration which is preferably shorter than 10 s, such that gas is forced through the filter device.

With the drying pulse, it is achieved that liquid remaining in the filter device after the cleaning pulse is predominantly expelled.

The second time duration is preferably longer than the first time duration, and is preferably less than 5 s, in particular less than 3 s.

It is generally conceivable that, during the drying pulse, the gas is forced through the filter device counter to the flow direction of the gas-liquid mixture. It is however particularly preferable for this to be performed in the same flow direction, such that the gas is forced through the blowing chamber and through the first fluid connector into the fluid device.

It is particularly preferable for the drying pulse to be performed one to six times in succession.

It is also advantageous if the filter arrangement is dried in a furnace after the cleaning process, that is to say after the cleaning pulse has been carried out and preferably after a drying pulse has been carried out.

The drying in the furnace may replace, or be performed in addition to, the drying pulse step. It is preferable for the drying to take place after the drying pulse has been generated, and after the filter arrangement has been dismounted from the blowing chamber. Subsequently, the filter arrangement is placed into the furnace and is dried therein, in particular in a temperature range between 50° C. and 250° C. The furnace is preferably a continuous furnace, such that the filter arrangements are placed onto a conveying means on one side, subsequently pass through the continuous furnace, and can be removed, having been fully dried, at the other end.

Finally, it is advantageous for the gas-liquid mixture contaminated with released contaminants to be captured in a capture chamber, as already mentioned above.

The capture chamber preferably has a volume which is greater than or equal to the volume of the gas used during the cleaning pulse, but which is possibly also smaller. In some cases, the capture chamber may have an elastically expandable volume expansion bladder or the like in order to achieve that the introduction of the gas-liquid mixture into the capture chamber is opposed by the lowest possible counter-pressure.

A droplet separator may be arranged in the capture chamber.

It is furthermore advantageous for the capture chamber to have a separation device which is designed to reduce or prevent a backflow of the contaminated gas-liquid mixture into the filter device.

Said separation device may be formed by a flap which, after the gas-liquid mixture has emerged, is pivoted or displaced over the second fluid connector in order to prevent a backflow. The separation device may however also be formed by passive devices, such as for example a siphon-like profile of a connection of the second fluid connector to the capture chamber, or by way of an inclination of the blowing chamber and of the filter arrangement mounted thereon It is altogether advantageous if the liquid volume used in the cleaning pulse is smaller than the volume of the filter arrangement.

It is consequently possible for the amount of contaminated liquid accrued during every cleaning pulse to be relatively small, such that disposal or treatment is also possible with little outlay.

It is self-evident that the features mentioned above and the features yet to be discussed below may be used not only in the respectively specified combination but also in other combinations or individually without departing from the scope of the present invention.

DESCRIPTION

Exemplary embodiments of the invention are illustrated in the drawing and will be discussed in more detail in the following description, in which.

PREFERRED EMBODIMENTS

Figure 1:
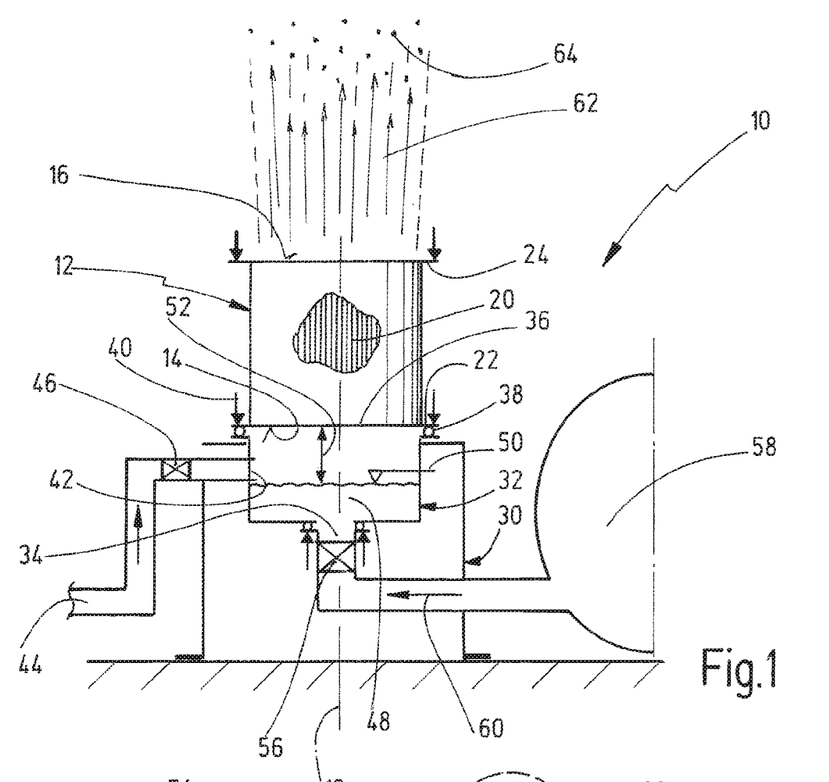
FIG. 1 is a schematic illustration of a first embodiment of a cleaning apparatus for carrying out the cleaning method.

FIG. 1 schematically illustrates a filter cleaning apparatus, which is denoted generally by 10.

The filter cleaning apparatus 10 serves for the cleaning or regeneration of filter arrangements 12, one of which is illustrated in FIG. 1. The filter arrangement may be in particular a diesel particle filter, in particular a diesel particle filter of the so-called closed type or of the "wall-flow filter" type. The filter arrangement 12 may however also be some other type of object to be cleaned, which has in particular a multiplicity of elongate ducts through which a gas and/or a liquid can flow.

The filter arrangement 12 has a first connector 14 at a first axial end and a second connector 16 at a second axial end. The filter arrangement 12 is of substantially rotationally symmetrical form, specifically along a longitudinal axis 18. The filter arrangement 12 has a cylindrical shell, which is preferably produced from metal. The cylinder ends form the first and second connectors 14, 16. In the interior of the filter arrangement 12 there is arranged a filter device 20. The filter device 20 may be in particular a porous ceramic structure with longitudinal ducts, as is schematically indicated in FIG. 1.

In the region of the first connector 14, the filter arrangement 12 has a first flange 22. In the region of the second connector 16, the filter arrangement 12 has a second flange 24.

The filter cleaning apparatus 10 comprises a frame 30 which may stand on a foundation. A blowing chamber 32 is fixed to the frame 30. The blowing chamber 32 has, on a lower side, a gas connector 34 which is preferably arranged concentrically with respect to the longitudinal axis 18. The gas connector 34 is preferably arranged at a first axial end of the blowing chamber 32. At the opposite axial end, the blowing chamber 32 has an opening 36, the cross section of which corresponds to that of the first connector 14. For the cleaning of a filter arrangement 12, said filter arrangement is mounted by way of the first flange 22 onto the blowing chamber 32, wherein a seal 38 is preferably positioned in between. The first flange 22 is subsequently connected to the blowing chamber 32 by way of a schematically indicated flange connection 40, specifically in particular in a fluid-type manner.

The cross section of the blowing chamber 32 adjacent to the filter arrangement 12 is preferably identical or substantially identical to that of the filter arrangement 12.

The blowing chamber 32 furthermore has a liquid connector 42, via which a liquid can be introduced into the blowing chamber 32. The liquid connector 42 is connected by way of a liquid valve 46 to a liquid source 44, such that liquid 48 can be introduced into the blowing chamber 32 as required.

It is shown in FIG. 1 that, for carrying out a cleaning method, the blowing chamber is filled with liquid 48 such that a liquid level 50 in the blowing chamber 32 lies below the first connector 14 of the filter arrangement 12, that is to say there is a spacing 52 in between. In other embodiments, the blowing chamber 32 may however also be completely filled. It is however preferable for the blowing chamber 32 to not be completely filled with liquid 48.

The gas connector 34 is connected, by way of a fast-opening gas cock 56, to a pressurized-gas source 58, which may for example be in the form of a pressurized-gas accumulator. The pressurized-gas accumulator preferably contains pressurized gas, wherein the pressure in the pressurized-gas accumulator preferably lies in a range between 4 bar and 12 bar, in particular in a range between 6 bar and 10 bar.

As will be discussed in more detail below, to carry out the cleaning method, after the blowing chamber 32 has been filled with the liquid 48, a cleaning pulse is generated in which gas 60 is conducted under pressure via the gas connector 34 into the blowing chamber 32, specifically for a first time duration which is shorter than 5 s, in particular shorter than 3 s, and in particular shorter than 2 s. Here, the time duration refers to the time during which the gas cock 56 is partially or fully open. The gas that flows into the blowing chamber 32 swirls up the liquid 48 contained therein so as to generate a gas-liquid mixture, which, owing to the pressure, is forced via the first fluid connector 14 through the filter device 20 and out of the second fluid connector 16, as is schematically illustrated in FIG. 1 by the reference designation 62.

Here, any particles adhering to the filter structure in the filter device 20 are entrained and are situated in the gas-liquid mixture which is expelled out of the second fluid connector 16, as schematically illustrated in FIG. 1 by the reference designation 64.

The compressed-air accumulator may for example have a volume in a range from 1 $m^3$ to 5 $m^3$. Said volume relates to the gas in the pressurized state. In the case of a pressure of, for example, 8 bar and a volume of 2 $m^3$ in the compressed-gas accumulator, it would be possible for the volume in the expanded state to be, for example, 16 $m^3$.

The cross-sectional diameter of the gas connector 34 may lie, for example, in the range between 1 cm and 10 cm.

For a cleaning pulse, a gas volume is used which, in an unpressurized state, lies preferably in the range between 0.5 $m^3$ and 4 $m^3$, with regard to the cleaning of a filter arrangement 12 for utility vehicles. The volume of the liquid 48 introduced into the blowing chamber 32 may for example lie in the range between 2 l and 12 l, in particular in the range from 3 l to 8 l.

A cleaning pulse of the above-described type, in which, in each case, the blowing chamber 32 is at least partially filled with liquid 48 and in each case one gas pressure shock is introduced in the manner of a pulse into the blowing chamber 32, is either performed once or else may also be repeated twice or multiple times.

Subsequently, it is preferably the case that a drying pulse is performed in which no liquid is introduced into the blowing chamber and only gas is forced in pulsed fashion through the filter arrangement 12. The volume of gas used in the drying pulse is preferably greater than that used for the cleaning pulse, for example in a range from 1 $m^3$ to 10 $m^3$. Furthermore, the time duration for which gas is conducted into the blowing chamber during the drying pulse is a second time duration which is longer than the first time duration and which preferably lies in a range from 1 s to 5 s.

Following the drying pulse, this may likewise be repeated as required. Subsequently, the filter arrangement 12 is preferably dismounted from the blowing chamber 32 and dried in a furnace until there is no more liquid contained in the filter device 20. The furnace may for example be a continuous furnace, such as will be described in more detail below, though may also be a furnace which operates in batchwise fashion.

The following FIGS. 2 to 7 show further embodiments of filter cleaning apparatuses 10, which are each suitable for carrying out the filter cleaning method and generally correspond, in terms of construction and mode of operation, to the filter cleaning apparatus 10 of FIG. 1. Identical elements are therefore denoted by the same reference designations.

Figure 2:
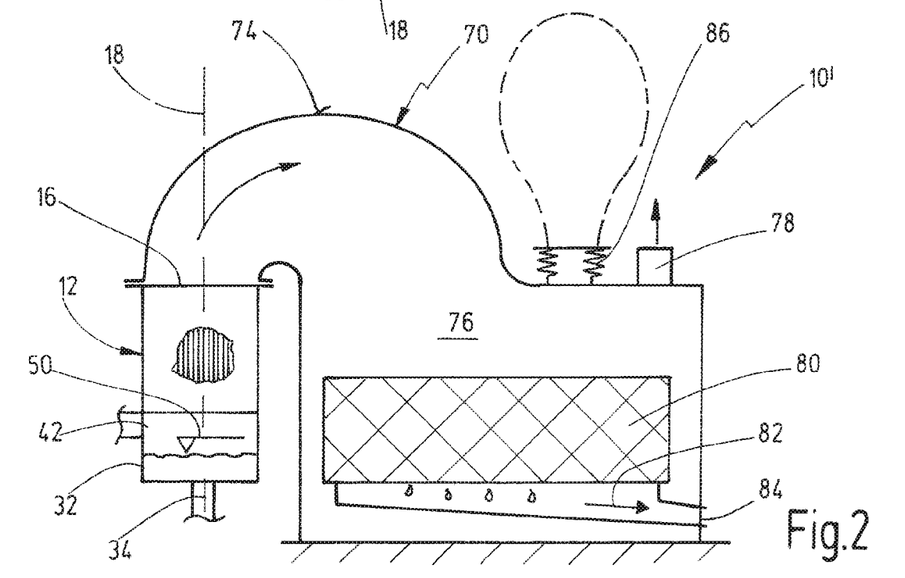
FIG. 2 shows a further embodiment of a cleaning apparatus.

FIG. 2 shows a filter cleaning apparatus 10' in which the second fluid connector 16 is connected to a capture chamber 70. The capture chamber 70 is designed such that the discharged gas-liquid mixture 62 is subjected to substantially no resistance, or to only a low resistance, in order to be able to ensure substantially free blowing-out of the filter arrangement 12. Accordingly, the volume of the capture chamber 70 may for example lie in a range which corresponds to that of the gas volume used in the cleaning pulse or in the drying pulse. Furthermore, the capture chamber 70 may have a device in order to achieve that the discharged gas-liquid mixture 62 does not fall back to the second fluid connector 16 again. For this purpose, the capture chamber 70 may have a wall section 72 which is inclined relative to the longitudinal axis 18, such that the gas-liquid mixture 62 is laterally deflected and then, finally, in the region of a diverting wall section 74, is diverted into a capture section 76, such that the first wall section 72 and the diverting wall section 74 form a type of "siphon" function.

The gas-liquid mixture can be captured and collected in the capture section 76, in order to subsequently be subjected to suitable aftertreatment.

The capture chamber 70 may comprise a blow-off valve 78 which ensures that gas contained in the capture chamber 70 is discharged during the cleaning pulse and during the drying pulse, as indicated in FIG. 2 by an arrow at 78.

Furthermore, in the capture chamber 70, there may be arranged a droplet separator 80, as is schematically indicated in FIG. 2, by way of which the captured liquid 82 can be separated off and collected in order, for example, to be discharged via a fluid connector 84.

In some cases, the capture chamber 70 may also comprise an expansion bladder 86 which makes it possible for the volume of the capture chamber 70 to be increased quickly as required, as is schematically indicated in FIG. 2.

Figure 3:
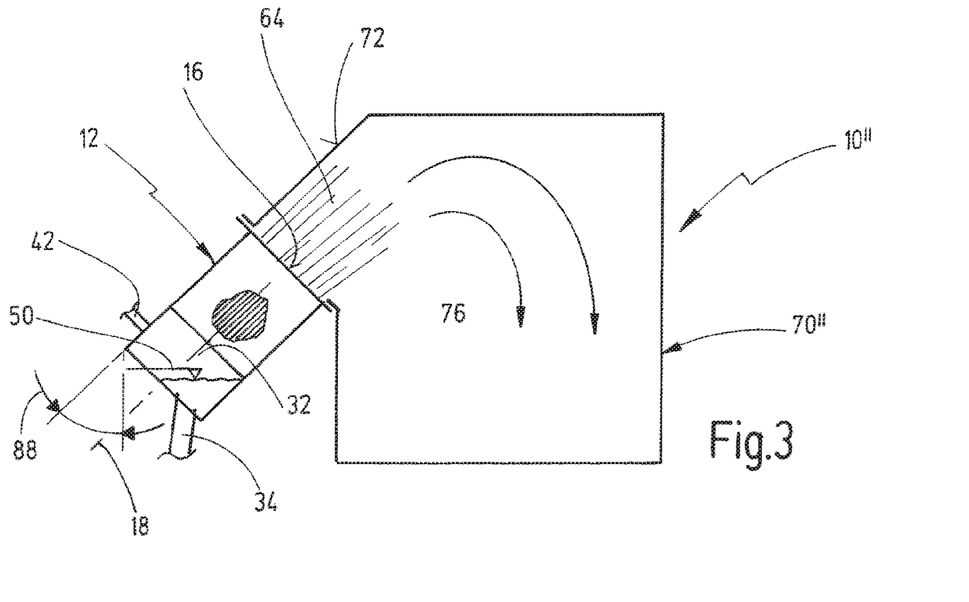
FIG. 3 shows a further embodiment of a cleaning apparatus.

FIG. 3 shows a further embodiment of a fluid cleaning apparatus 10", in which the filter arrangement 12 is mounted on the blowing chamber 32 such that a longitudinal axis 18 of the filter arrangement 12 is inclined at an angle 88 relative to the vertical, which angle may in this case preferably lie in a range between 20° and 80°, in particular in a range between 20° and 60°. In this way, the first wall section 72, which adjoins the second fluid connector 16, can be oriented parallel to the longitudinal axis 18, such that the resistance to which the gas-liquid mixture 62 is subjected can be reduced. Owing to the inclination of the filter arrangement 12, it is likewise possible to prevent the gas-liquid mixture 62 from passing back to the second fluid connector 16 again. A droplet separator 80 or the like may likewise be arranged in the capture chamber 70" shown in FIG. 3. With regard to other aspects, too, the capture chamber 70" may be of similar construction to the capture chamber 70 of FIG. 2.

Figure 4:
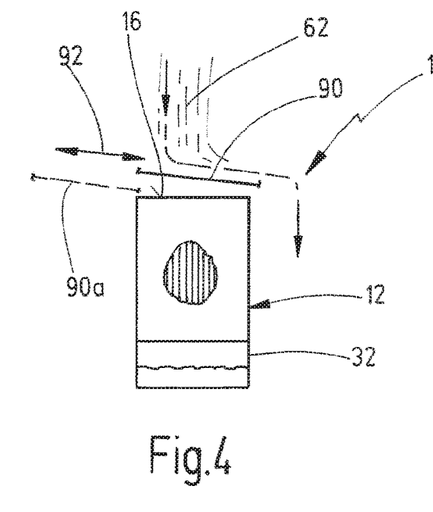
FIG. 4 shows a further embodiment of a cleaning apparatus.

FIG. 4 shows a further device for preventing a backflow of the gas-liquid mixture 62 to the second fluid connector 16. For this purpose, a mechanically movable flap 90 is used, which is movable, as shown at 92, between an opening-up position 90a, in which the gas-liquid mixture 62 can emerge from the second connector 16 unhindered, and a separation position 90. In the separation position 90, the discharged gas-liquid mixture 62 falls onto the top side of the flap 90 and can then flow off laterally, as is schematically indicated in FIG. 4.

Figure 5:
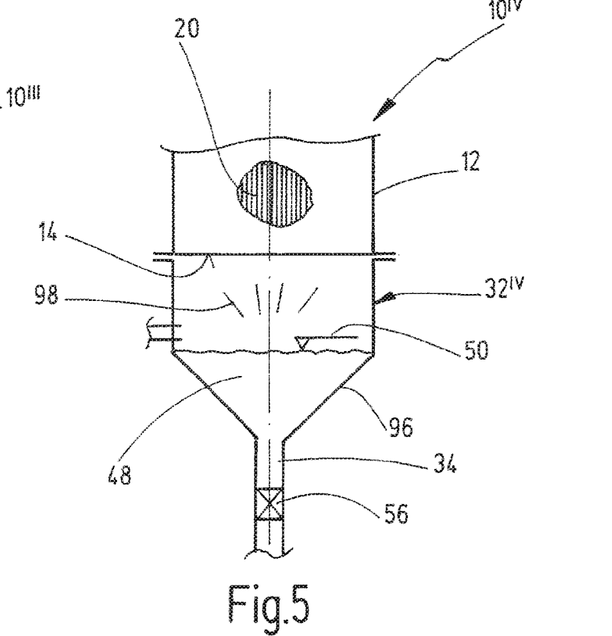
FIG. 5 shows a further embodiment of a cleaning apparatus.

FIG. 5 shows a further fluid cleaning apparatus $10^{IV}$, in which the blowing chamber $32^{IV}$ comprises a conical section 96 from the gas connector 34 toward the first fluid connector 14. By way of this measure, it is possible, in some embodiments, to realize an even more uniform distribution of the ingress of the gas-liquid mixture 62 over the cross section of the first fluid connector 14. For this purpose, it is possible, as schematically indicated in FIG. 5, for guide plates 98 to also be arranged in the blowing chamber. In some variants, such guide plates may be situated above the liquid level 50, and in other variants, said guide plates may be situated below said liquid level. In some variants, such guide plates 98 are not necessary at all.

Figure 6:
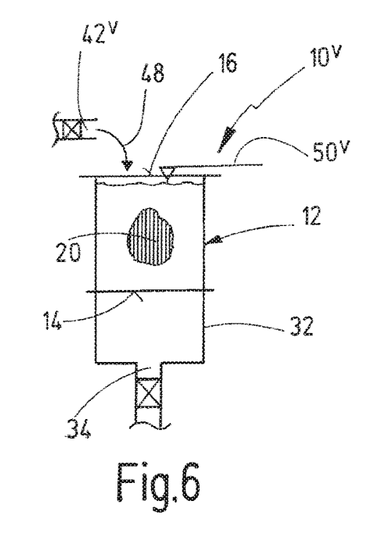
FIG. 6 shows a further embodiment of a cleaning apparatus.

FIG. 6 shows a further filter device $10^V$, in which a liquid connector $42^V$ is arranged such that liquid 48 is introduced not only into the blowing chamber 32 but also into the filter arrangement 12 arranged above said blowing chamber, in such a way that the liquid level $50^V$ lies in the region of the filter device 20.

Figure 7:
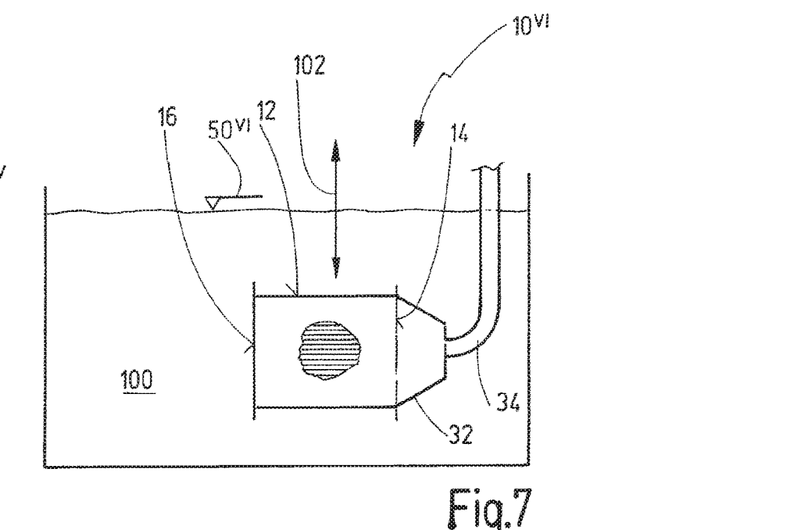
FIG. 7 shows a further embodiment of a cleaning apparatus.

FIG. 7 shows a further embodiment of a fluid cleaning apparatus $10^{VI}$, in which a filter arrangement 12 is, for a cleaning pulse to be performed, lowered into a liquid bath 100, specifically by way of a lifting device 102, as is schematically indicated in FIG. 7.

In this embodiment, the filter arrangement 12 and the blowing chamber 32 are completely filled with liquid, before the cleaning pulse is performed via the gas connector 34. The gas-liquid mixture that emerges from the second fluid connector 16 then mixes directly with the liquid contained in the liquid bath 100. It is self-evident that the liquid in the bath is exchanged and/or purified at regular intervals.

Figures 8, 9:
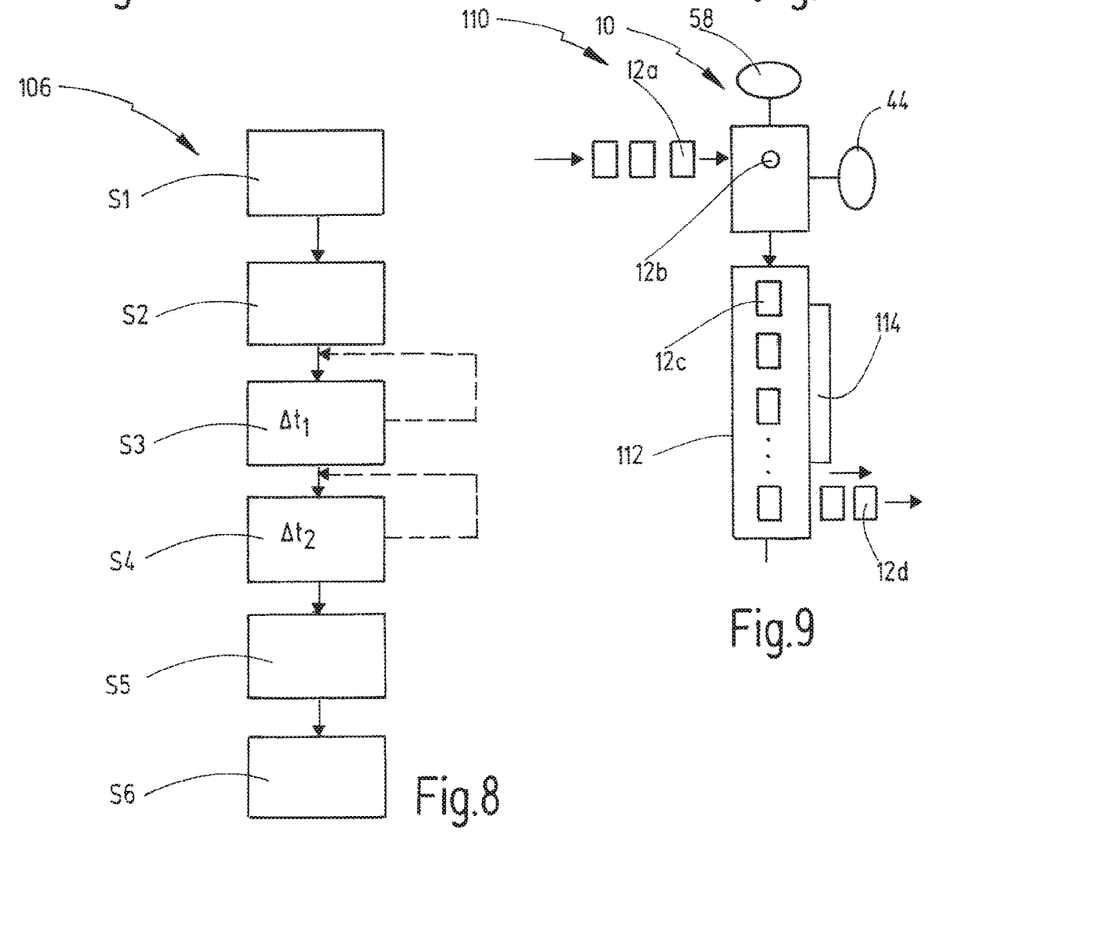
FIG. 8 shows an exemplary flow diagram for the execution of the method.
FIG. 9 shows a schematic plan view of a cleaning installation which comprises a cleaning apparatus.

FIG. 8 schematically shows a flow diagram of the method, denoted specifically by 106.

In a first step S1, a filter arrangement 12 is mounted by way of its first fluid connector 14 on a blowing chamber 32, preferably in fluid-tight fashion. In a second step S2, a liquid is introduced into the blowing chamber 32.

In a subsequent step S3, a cleaning pulse is performed, specifically for a first time duration $\Delta t_1$. Said step S3 may be repeated as required, as indicated by a dashed line.

Following the cleaning pulse or the cleaning pulses, in step S4, at least one drying pulse is performed, specifically for a second time duration $\Delta t_2$. The drying pulse may also be repeated if necessary, as is schematically indicated in FIG. 8.

After one or more drying pulses have been performed, the filter arrangement 12 is dismounted from the blowing chamber 32 in step S5, and the filter arrangement 12 is subsequently dried in a furnace (step S6).

FIG. 9 shows, in a schematic plan view, a layout of a cleaning installation 112 in which filter arrangements 12a are supplied individually to the filter cleaning apparatus 10 and then, when they have been mounted (shown at 12b), are subjected to a cleaning pulse and optionally a drying pulse. The filter arrangements 12c which have then thereafter been dismounted from the filter cleaning apparatus 10 are placed into a furnace, which is preferably in the form of a continuous furnace, such that the filter arrangements 12c can be placed onto one axial end of a conveyor belt and then pass through the continuous furnace 12, in which they are heated by way of a heating device 114 in order for a final drying process to be performed. At the other axial end of the continuous furnace 112, the then fully cleaned and dried filter arrangements 12d are removed, as is schematically indicated in FIG. 9.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for cleaning a filter arrangement which has a longitudinal axis, a first fluid connector at a first axial end, a second fluid connector at a second axial end that is separated from the first axial end along the longitudinal axis, and a filter device which is arranged between the first and second fluid connectors and which has a surface to which contaminants can adhere, the method having the following steps:
connecting the first fluid connector to a blowing chamber which has a gas connector, such that the filter arrangement is at least partially arranged above the blowing chamber;
at least partially filling the blowing chamber with a liquid, wherein the liquid remains in the blowing chamber due to gravitational forces; and
generating a cleaning pulse, in which gas is first conducted under pressure via the gas connector into the blowing chamber and enters below a liquid level of the liquid such that the gas is forcibly conducted through the liquid contained therein and swirls the liquid in the blowing chamber such that liquid becomes at least partially atomized in a gas-liquid mixture, and for a first time duration that is shorter than 5 seconds, the gas-liquid mixture is then forced via the first fluid connector through the filter device and out of the second fluid connector at the second axial end, wherein during the cleaning pulse no liquid enters the filter device before the gas-liquid mixture is introduced,
wherein the second fluid connector is open and is not covered during the cleaning pulse, such that the gas-liquid mixture emerging from the second fluid connector at the second axial end can emerge from the filter device in substantially unimpeded fashion.

2. The method according to claim 1, wherein a ratio between a gas volume of the gas that is used in the cleaning pulse and a liquid volume of the liquid that is used in the cleaning pulse lies in a range between 20:1 and 4000:1.

3. The method according to claim 1, wherein the gas connector of the blowing chamber is connected by way of a fast-opening gas valve or gas cock device to a pressurized-gas source.

4. The method according to claim 1, wherein the cleaning pulse is performed 1 to 4 times in succession.

5. The method according to claim 1, wherein, after the cleaning pulse or after a plurality of cleaning pulses, at least one drying pulse is generated, wherein gas is conducted under pressure into the filter device for a second time duration, such that the gas is forced through the filter device.

6. The method according to claim 5, wherein the drying pulse is performed 1 to 6 times in succession.

7. The method according to claim 1, wherein the filter arrangement is dried in a furnace after cleaning.

8. A method for cleaning a filter arrangement which has a longitudinal axis, a first fluid connector at a first axial end, a second fluid connector at a second axial end that is separated from the first axial end along the longitudinal axis, and a filter device which is arranged between the first and second fluid connectors and which has a surface to which contaminants can adhere, the method having the following steps:
connecting the first fluid connector to a blowing chamber which has a gas connector;
at least partially filling the blowing chamber with a liquid without introducing liquid into the filter device; and
generating a cleaning pulse, in which gas is conducted under pressure via the gas connector into the blowing chamber, such that a gas-liquid mixture is forced via the first fluid connector through the filter device and essentially unimpeded out of the second fluid connector, wherein the gas entering the blowing chamber enters below a liquid level of the liquid, is forcibly conducted through the liquid contained therein, and swirls the liquid in the blowing chamber such that liquid becomes at least partially atomized in the gas-liquid mixture before the gas-liquid mixture is forced through the filter device, and wherein the gas is blown into the blowing chamber from the bottom upward, counter to the gravitational force.

9. The method according to claim 8, wherein the second fluid connector is open or is connected to a collecting chamber, the volume of which is larger than a volume of the blowing chamber.

10. The method according to claim 8, wherein a ratio between a gas volume of the gas that is used in the cleaning pulse and a liquid volume of the liquid that is used in the cleaning pulse lies in a range between 20:1 and 4000:1.

11. The method according to claim 8, wherein the gas connector of the blowing chamber is connected by way of a fast-opening gas valve or gas cock device to a pressurized-gas source.

12. The method according to claim 8, wherein the cleaning pulse is performed 1 to 4 times in succession.

13. The method according to claim 8, wherein, after the cleaning pulse or after a plurality of cleaning pulses, at least one drying pulse is generated, wherein gas is conducted under pressure into the filter device for a second time duration which is shorter than 10 seconds, such that the gas is forced through the filter device.

14. The method according to claim 13, wherein the drying pulse is performed 1 to 6 times in succession.

15. The method according to claim 8, wherein the filter arrangement is dried in a furnace after cleaning.

16. The method according to claim 8, wherein the gas-liquid mixture contaminated with released contaminants is captured in a capture chamber.

17. The method according to claim 16, wherein a backflow of the contaminated gas-liquid mixture into the filter device is prevented using a separation device of the capture chamber.

* * * * *